(12) United States Patent
Schloffer et al.

(10) Patent No.: US 10,544,485 B2
(45) Date of Patent: Jan. 28, 2020

(54) ADDITIVE MANUFACTURING OF HIGH-TEMPERATURE COMPONENTS FROM TIAL

(71) Applicant: MTU Aero Engines AG, Munich (DE)

(72) Inventors: Martin Schloffer, Munich (DE); Wilfried Smarsly, Munich (DE)

(73) Assignee: MTU AERO ENGINES AG, Munich (DE)

( * ) Notice: Subject to any disclaimer, the term of this patent is extended or adjusted under 35 U.S.C. 154(b) by 260 days.

(21) Appl. No.: 15/600,864

(22) Filed: May 22, 2017

(65) Prior Publication Data

US 2017/0335436 A1 Nov. 23, 2017

(30) Foreign Application Priority Data

May 23, 2016 (EP) .................... 16170798

(51) Int. Cl.
| | | |
|---|---|---|
| *B22F 3/15* | (2006.01) | |
| *C22C 14/00* | (2006.01) | |
| *B33Y 10/00* | (2015.01) | |
| *B33Y 70/00* | (2015.01) | |
| *B23K 15/00* | (2006.01) | |

(52) U.S. Cl.
CPC ............... *C22C 14/00* (2013.01); *B22F 3/15* (2013.01); *B23K 15/0086* (2013.01); *B33Y 10/00* (2014.12); *B33Y 70/00* (2014.12)

(58) Field of Classification Search
CPC ....... C22C 14/00; B23K 15/0086; B22F 3/15; B33Y 10/00; B33Y 70/00
See application file for complete search history.

(56) References Cited

U.S. PATENT DOCUMENTS

| | | |
|---|---|---|
| 6,524,407 B1 | 2/2003 | Paul et al. |
| 8,888,461 B2 | 11/2014 | Smarsly et al. |
| 9,120,151 B2 | 9/2015 | Godfrey et al. |
| 2009/0151822 A1 | 6/2009 | Appel et al. |
| 2010/0015005 A1 | 1/2010 | Oehring et al. |
| 2011/0189026 A1 | 8/2011 | Chladil et al. |
| 2011/0277891 A1 | 11/2011 | Clemens et al. |
| 2014/0037983 A1 | 2/2014 | Godfrey et al. |
| 2015/0041442 A1 | 2/2015 | Thieme et al. |
| 2016/0023307 A1 | 1/2016 | Suciu et al. |
| 2016/0083304 A1 | 3/2016 | Mironets et al. |

FOREIGN PATENT DOCUMENTS

| | | |
|---|---|---|
| CN | 103820697 A | 5/2014 |
| DE | 4037959 A1 | 6/1991 |
| DE | 10058155 A1 | 5/2002 |
| DE | 102004056582 B4 | 6/2008 |
| DE | 102007051499 A1 | 4/2009 |
| DE | 102012007114 B3 | 5/2013 |
| EP | 1015650 B1 | 1/2004 |
| EP | 2386663 A1 | 11/2011 |
| EP | 1878522 B1 | 2/2012 |
| EP | 2423341 B1 | 7/2013 |
| EP | 2692464 A2 | 2/2014 |
| GB | 2238794 A | 6/1991 |
| WO | 2014149122 A2 | 9/2014 |
| WO | 2015030879 A2 | 3/2015 |

OTHER PUBLICATIONS

Tang H P et al. "Additive manufacturing of a high niobium-containing titanium aluminide alloy by selective electron beam melting", Materials Science and Engineering A: Structural Materials: Properties, Microstructures and Processing, vol. 636 Mar. 31, 2015, pp. 103-107.

Brueckner Frank et al.: "Laser-based manufacturing of components using materials with high cracking susceptibility", Journal of Laser Applications, American Institute of Physics, vol. 28, No. 2, Mar. 31, 2016; "VI. As Built Microstructure After Hip and Additional Heat Treatments".

*Primary Examiner* — Jessee R Roe
(74) *Attorney, Agent, or Firm* — Abel Schillinger, LLP

(57) ABSTRACT

Disclosed is a process for producing a component from a TiAl alloy by layer-by-layer deposition of powder on a substrate and/or an already produced semifinished product. The component has a proportion of x at % of aluminum which is in the range from about 34 to about 47 at % of aluminum, the powder having a proportion of x+1 at % to x+6 at % of aluminum. Also disclosed is a component formed from a TiAl alloy which has been produced by a corresponding process.

20 Claims, No Drawings

ADDITIVE MANUFACTURING OF HIGH-TEMPERATURE COMPONENTS FROM TIAL

CROSS-REFERENCE TO RELATED APPLICATIONS

The present application claims priority under 35 U.S.C. § 119 of European Patent Application No. 16170798.9, filed May 23, 2016, the entire disclosure of which is expressly incorporated by reference herein.

BACKGROUND OF THE INVENTION

1. Field of the Invention

The present invention relates to a process for producing a component from a TiAl alloy by layer-by-layer deposition of powder on a substrate and/or an already produced semifinished product, wherein the component is preferably to be used for high-temperature applications in turbomachines, such as aircraft engines. The present invention also relates to a corresponding component and to a powder composed of a TiAl alloy for use in the production process for the corresponding component.

2. Discussion of Background Information

Titanium aluminides and TiAl alloys including a majority of intermetallic compounds in the form of titanium aluminides are of interest for use in turbomachines such as stationary gas turbines and aircraft engines because of their low specific weight and their high strength, especially even at high use temperatures, because of the ordered atomic structure of the intermetallic compounds. Correspondingly, a multitude of TiAl alloys are already known from the prior art for use in components of turbomachines and especially stationary gas turbines or aircraft engines. More particularly, use as a material for turbine blades has also already been described in the prior art.

Components of this kind made from TiAl or TiAl alloys are typically produced by casting, especially fine casting, and by forming through forging.

In addition, it is also known that components can be produced from TiAl or TiAl alloys by generative or additive methods in which the components are produced by layer-by-layer deposition from powder. The powder particles can be bonded to one another within each layer and to the layer beneath by selective melting or sintering by means of high-energy beams, such as electron beams or laser beams, in accordance with the cross-sectional shape of the component to be produced. Examples of these are described in EP 1 878 522 A1 or US 2014/0037983 A1, the entire disclosures of which are incorporated by reference herein.

In order to obtain defect-free components, especially without pores and the like, US 2014/0037983 A1 describes compaction of a component produced by generative or additive manufacturing from TiAl alloys, wherein the component is provided with an aluminum-containing capsule layer formed from an MCrAlY layer where M is cobalt or nickel or a combination of cobalt and nickel or a TiAlCr layer.

EP 1 878 522 A1 in turn describes a process for mass production of components from intermetallic compounds by electron beam melting, in which TiAl powder having the same chemical composition as the ultimately produced component is used for additive or generative production by means of electron beam melting.

However, there is further need for optimization in the generative or additive manufacturing of components from TiAl and TiAl alloys, since the TiAl materials customarily used have been developed and optimized for casting-type manufacturing processes or for forming through forging, such that the melting and rapid solidification of the powder in additive manufacturing can cause solidification textures and hence anisotropies in the mechanical properties. Furthermore, there is the problem of variation in the chemical composition through the component produced and corresponding inhomogeneity of the properties. Correspondingly, such problems are to be avoided or minimized, and generative production of components from TiAl materials is to be enabled, where the components produced are to have a homogeneous microstructure and correspondingly homogeneous properties through the entire component. Furthermore, defect-free production of the components is to be possible in an effective manner.

SUMMARY OF THE INVENTION

The present invention provides a process for producing a component from a TiAl alloy by layer-by-layer deposition of powder on a substrate and/or an already produced semifinished product. The component has a proportion of x at % of aluminum which ranges from about 34 at % to about 47 at % of aluminium and the powder has a proportion of from x+1 at % to x+6 at % of aluminium.

In one aspect of the process, the powder may have a proportion of from x+2 at % to x+6 at % of aluminum.

In another aspect of the process, the powder may be melted in the layer-by-layer deposition. For example, the powder may be melted by a high-energy beam. In particular, the layer-by-layer deposition may be effected by electron beam melting (EBM) or laser melting.

In yet another aspect, the powder may have a chemical composition that enables at least partial peritectic solidification of molten powder and/or the powder may be formed from a TiAl alloy comprising from about 35 at % to about 53 at % of aluminium as well as niobium, molybdenum and/or tungsten, optionally zirconium, optionally silicon and optionally carbon, remainder titanium and unavoidable impurities. For example, the powder may be formed from a TiAl alloy comprising from about 35 at % to about 53 at % of aluminum, from about 6 at % to about 11 at % of niobium, from about 0.1 at % to about 5 at % of molybdenum and/or from about 0.1 at % to about 2 at % of tungsten, from 0 at % to about 4 at % of zirconium, from 0 at % to about 4 at % of silicon and from 0 at % to about 1 at % of carbon, remainder titanium and unavoidable impurities.

In a still further aspect of the process, the already produced semifinished product and/or the powder may be preheated to a temperature of from about 1000° C. to about 1150° C. and/or the layer-by-layer formation of the component may be followed by hot isostatic pressing of the component at temperatures of from about 1200° C. to about 1300° C. and at pressures of from about 100 MPa to about 200 MPa for from about 2 to about 8 hours.

The present invention also provides a component which has been produced by the process set forth above (including the various aspects thereof).

In one aspect thereof, the component may have a composition of from about 34 at % to about 47 at % of aluminum, from about 6 at % to about 11 at % of niobium, from about 0.1 at % to about 5 at % of molybdenum and/or from about 0.1 at % to about 2 at % of tungsten, from 0 at % to about 4 at % of zirconium, from 0 at % to about 4 at % of silicon and from 0 at % to about 1 at % of carbon, remainder titanium and unavoidable impurities. For example, the component may have a composition of from about 34 at % to about 39 at % of aluminum, from about 6 at % to about 11 at % of niobium, from about 3 at % to about 5 at % of molybdenum and/or from about 0.6 at % to about 2 at % of tungsten, from 0 at % to about 4 at % of zirconium, from 0 at % to about 4 at % of silicon, remainder titanium and unavoidable impurities, or a composition of from about 43 at % to about 47 at % of aluminum, from about 6 at % to about 9 at % of niobium, from about 0.1 at % to about 1 at % of molybdenum, from about 0.1 at % to about 2 at % of tungsten, from about 0.1 at % to about 4 at % of zirconium, from about 0.5 at % to about 4 at % of silicon, from about 0.4 at % to about 1 at % of carbon, remainder titanium and unavoidable impurities.

In another aspect, the component may have a predominantly lamellar microstructure. For example, the component may have a lamellar structure in more than about 75% by volume (e.g., more than about 90% by volume) of the component.

In yet another aspect, the microstructure of the component may comprise Si-containing, C-containing and Zr-containing precipitates.

The present invention also provides a powder composed of a TiAl alloy for use in the process set forth above. The powder may have a composition of from about 35 at % to about 53 at % of aluminum, from about 6 at % to about 11 at % of niobium, from about 0.1 at % to about 5 at % of molybdenum and/or from about 0.1 at % to about 2 at % of tungsten, from 0 at % to about 4 at % of zirconium, from 0 at % to about 4 at % of silicon and from 0 at % to about 1 at % of carbon, remainder titanium and unavoidable impurities. For example, the powder may have a composition of from about 35 at % to about 45 at % of aluminum, from about 6 at % to about 11 at % of niobium, from about 3 at % to about 5 at % of molybdenum and/or from about 0.6 at % to about 2 at % of tungsten, from 0 at % to about 4 at % of zirconium, from 0 at % to about 4 at % of silicon, remainder titanium and unavoidable impurities, or from about 45 at % to about 53 at % of aluminum, from about 6 at % to about 9 at % of niobium, from about 0.1 at % to about 1 at % of molybdenum, from about 0.1 at % to about 2 at % of tungsten, from about 0.1 at % to about 4 at % of zirconium, from about 0.5 at % to about 4 at % of silicon, from about 0.4 at % to about 1 at % of carbon, remainder titanium and unavoidable impurities.

As set forth above, the present invention proposes, in a first aspect of the present invention, a process for producing a component from a TiAl alloy by layer-by-layer deposition of powder on a substrate and/or on an already produced semifinished product, in which the aluminum content of the powder used is elevated compared to the desired aluminum content in the finished component. An increase in the aluminum content can firstly counteract the problem of aluminum evaporating off in the course of melting of the powder, and can secondly achieve favorable solidification with the formation of a fine microstructure without unwanted texture. According to the invention, the aluminum content of the powder used for deposition is from about 1 at % to about 6 at %, preferably from about 2 at % to about 6 at %, above the proportion of aluminum desired for the finished component, where the proportion of aluminum in the finished component is in the range from about 34 at % to about 47 at %.

Correspondingly, in the case of use of a powder mixture composed of element powders or preliminary alloys or of a powder composed of a TiAl material, the chemical composition of the powder mixture or of the TiAl material is altered with respect to the desired target composition of the component such that the aluminum content is increased by from about 1 at % to about 6 at %.

In the process, the layer-by-layer deposition or the bonding of the powder particles in the corresponding layers to one another and/or to a layer already deposited beneath can be effected in the corresponding layer by inciting of the powder in accordance with the cross-sectional shape of the component to be produced, specifically by means of a high-energy beam such as a laser beam or preferably an electron beam. By virtue of the use as a starting material of a powder having an aluminum content of from about 1 at % to about 6 at %, preferably from about 2 at % to about 6 at %, above the aluminum content desired for the finished component for the process of the invention, it is possible to use a higher energy introduction rate in the production of the component without giving rise to unwanted anisotropies in the mechanical properties as a result of the elevated evaporating-off of aluminum on introduction of energy in the component. In this way, production can be effected more quickly and the production process can be conducted in a more economically viable manner. More particularly, it is proposed that the process parameters in the melting for the layer-by-layer deposition be chosen so as to effect controlled evaporation of aluminum in the order of magnitude of from about 1 at % to about 6 at %, preferably from about 2 at % to about 6 at %. The adjustment in the corresponding process parameters can be determined by a person skilled in the art in a simple manner by experiments and/or simulation. The process parameters are preferably adjusted such that the evaporation of the aluminum, within the scope of the aforementioned range of values, is effected at a value which is essentially constant over the entire production process of the component, preferably exactly at the value by which the aluminum content of the powder has been increased compared to the desired aluminum content of the component.

Whereas attempts are made in the prior art to minimize the evaporation of aluminum in the powder by means of a low energy introduction rate, and particular attention is paid to keeping the evaporation of aluminum at less than 1 at %, the present invention proceeds from a different approach. According to the present invention, the aluminum content which evaporates off is deliberately kept in the powder, in order to be able to produce a component having the desired material composition and without unwanted anisotropies in terms of its mechanical properties in spite of a high energy introduction rate and correspondingly high aluminum evaporation of more than about 1 at %, preferably more than about 2 at %, of Al.

Even though this approach to a solution might seem simple in retrospect, the problem described at the outset has never been solved to date in this way in the technical field. Such high aluminum evaporations in the generative production process of components made from TiAl alloy have not been accepted, or the energy introduction rates have always been chosen at a correspondingly low level.

The powder can advantageously be chosen such that at least some degree of peritectic solidification takes place, meaning that, in the solidification process, β-titanium phase is present together with molten phase, which are converted to α-titanium phase.

Correspondingly, the powder may be formed from a TiAl alloy comprising from about 35 at % to about 53 at % of aluminum, in order to enable the at least partial peritectic solidification.

In addition, the TiAl alloy which is melted layer by layer by means of the powder in order then to solidify in the corresponding layer may further comprise niobium, molybdenum and/or tungsten, optionally zirconium, optionally silicon and optionally carbon, the remainder comprising titanium and unavoidable impurities.

The silicon and the carbon, in the at least partial peritectic solidification, improve the formation of a fine solidification microstructure and the avoidance of texture resulting from the precipitation of silicon-containing and/or carbon-containing precipitates, especially silicides and/or carbides, which also prevent particle growth in the course of further cooling of the solidified material which is at first present in the form of an α-titanium phase. The Nb, W and Mo elements that stabilize the β phase enable enhanced peritectic solidification and, in the formation of the γ lamellae that arise in the course of further cooling, ensure the formation of fine precipitates of the β-titanium phase in the γ lamellae, which has a positive effect on the creep resistance of the component correspondingly produced.

Accordingly, in a further aspect of the present invention for which protection is sought independently and in combination with other features of the invention, a powder material is provided, formed from a TiAl alloy comprising or consisting of a chemical composition with from about 35 at % to about 53 at %, e.g., from about 48 at % to about 51 at %, or from about 49 at % to about 51 at %, of aluminum, from about 6 at % to about 11 at %, e.g., from about 7 at % to about 9 at %, e.g., from about 8 at % to about 9 at %, of niobium, from about 0.1 at % to about 5 at % of molybdenum and/or from about 0.1 at % to about 2 at % of tungsten, from 0 at % to about 4 at % of zirconium, from 0 at % to about 4 at %, e.g., from about 1 at % to about 4 at %, or from about 2 at % to about 4 at % of silicon, and from 0 at % to about 1 at % of carbon, e.g., from about 0.4 at % to about 0.5 at % of carbon, the remainder being titanium and unavoidable impurities.

It is particularly preferable when the powder has a chemical composition with either from about 35 at % to about 45 at % of aluminum, from about 6 at % to about 11 at % of niobium, from about 3 at % to about 5 at % of molybdenum and/or from about 0.6 at % to about 2 at % of tungsten, from 0 at % to about 4 at % of zirconium, from 0 at % to about 4 at % of silicon, the remainder being titanium and unavoidable impurities; or from about 45 at % to about 53 at % of aluminum, from about 6 at % to about 9 at % of niobium, from about 0.1 at % to about 1 at % of molybdenum, from about 0.1 to about 2 at % of tungsten, from about 0.1 at % to about 4 at % of zirconium, from about 0.5 at % to about 4 at % of silicon, from about 0.4 at % to about 1 at % of carbon, the remainder being titanium and unavoidable impurities.

This gives rise to a composition which, in the electron beam melting (EBM) of a thin powder layer and the solidification thereof, can form a fully lamellar microstructure, the lamellae of which are formed predominantly from γ-TiAl. At the lamellar interfaces of the γ lamellae, many silicides and carbides can form, whereas even fine β-titanium precipitates can be formed in the γ lamellae. This gives rise overall to a fine-grain, homogeneous microstructure in which the particle sizes of the γ lamella colonies can be kept small, which has a favorable effect on strength and ductility.

In the process, the already produced semifinished product and/or the powder can be preheated to a temperature from about 1000° C. to about 1150° C., which ensures gradual cooling and/or deintercalation within this temperature range, which enables conversion of α-titanium phase to γ-TiAl close to the thermodynamic equilibrium during the cooling and/or deintercalation within this temperature range. Moreover, the gradual cooling, or the holding at the preheating temperature of from about 1000° C. to about 1150° C., enables the precipitation of the silicides and carbides.

A correspondingly generatively produced component can finally be subjected to hot isostatic pressing at temperatures of from about 1200° C. to about 1300° C. and at pressures of from about 100 MPa to about 200 MPa for about 2 to about 8 hours in order to compress it and in order to dissolve coarse carbides and to eliminate possible pores, there being no need to conduct any further additional high-temperature heat treatments aside from hot isostatic pressing when γ lamellae with widths of from about 25 nm to about 250 nm are established in the component in the course of cooling from the temperature at which the hot isostatic pressing is conducted.

However, a final deintercalating calcination with a hold time of from about 1 hour to about 100 hours at temperatures of from about 900° C. to about 1000° C. can advantageously stabilize the microstructure and give the component better mechanical processibility.

Correspondingly, in a further aspect of the invention, for which protection is sought independently and in combination with other aspects of the invention, a component which has been produced by the process described is claimed, preferably produced using the above-described powder material.

A corresponding component, especially a component of turbomachines for high-temperature applications, especially a blade, is formed from an alloy comprising or consisting of a chemical composition of from about 34 at % to about 47 at % of aluminum, from about 6 at % to about 11 at %, e.g., from about 7 at % to about 9 at %, or from about 8 at % to about 9 at % of niobium, from about 0.1 at % to about 5 at % of molybdenum and/or from about 0.1 at % to about 2 at % of tungsten, from 0 at % to about 4 at % of zirconium, from 0 at % to about 4 at %, e.g., from about 1 at % to about 4 at %, or from about 2 at % to about 4 at %, of silicon, from 0 at % to about 1 at %, e.g., from about 0.4 at % to about 0.5 at %, of carbon, the remainder being titanium and unavoidable impurities. It is particularly preferable when the component has a chemical composition having either from about 34 at % to about 39 at % of aluminum, from about 6 at % to about 11 at % of niobium, from about 3 at % to about 5 at % of molybdenum and/or from about 0.6 at % to about 2 at % of tungsten, from 0 at % to about 4 at % of zirconium, from 0 at % to about 4 at % of silicon, the remainder being titanium and unavoidable impurities; or from about 43 at % to about 47 at % of aluminum, from about 6 at % to about 9 at % of niobium, from about 0.1 at % to about 1 at % of molybdenum, from about 0.1 at % to about 2 at % of tungsten, from about 0.1 at % to about 4 at % of zirconium, from about 0.5 at % to about 4 at % of silicon, from about 0.4 to about 1 at % of carbon, the remainder being titanium and unavoidable impurities.

A corresponding component may have a predominantly lamellar microstructure, especially a lamellar structure in more than about 75% by volume, e.g., more than about 90% by volume, of the component. The lamellar microstructure preferably consists of γ and α lamellae. In addition, the remainder of the component, i.e. up to a maximum of about 25% by volume of the component, preferably consists predominantly of globular γ and β precipitates that are further preferably in an order of magnitude of less than about 15 µm.

The microstructure of the component may further include silicon-containing and carbon-containing precipitates or silicides and carbides, preferably at the lamellar interfaces. The microstructure preferably includes various silicides and carbides.

TiAl alloy or TiAl material in the present invention is understood to mean an alloy formed predominantly from titanium and aluminum, i.e. one in which the main constituents are titanium and aluminum, meaning that the greatest proportions in the alloy in terms of amount, in atom % or % by weight, are titanium and aluminum. In addition, the alloys or materials include intermetallic compounds in the form of γ-TiAl.

What is claimed is:

1. A process for producing a component from a TiAl alloy by layer-by-layer deposition of powder on a substrate and/or an already produced semifinished product, wherein the component has a proportion of x at % of aluminum which ranges from 34 at % to 47 at % of aluminum and the powder has a proportion of from x+1 at % to x+6 at % of aluminum.

2. The process of claim 1, wherein the powder has a proportion of from x+2 at % to x+6 at % of aluminum.

3. The process of claim 1, wherein the powder is melted in the layer-by-layer deposition.

4. The process of claim 3, wherein the powder is melted by a high-energy beam.

5. The process of claim 3, wherein the layer-by-layer deposition is effected by electron beam melting (EBM) or laser melting.

6. The process of claim 1, wherein the powder has a chemical composition that enables at least partial peritectic solidification of molten powder.

7. The process of claim 1, wherein the powder is formed from a TiAl alloy comprising from 35 at % to 53 at % of aluminum as well as niobium, molybdenum and/or tungsten, optionally zirconium, optionally silicon and optionally carbon, remainder titanium and unavoidable impurities.

8. The process of claim 1, wherein the powder is formed from a TiAl alloy comprising from 35 at % to 53 at % of aluminum, from 6 at % to 11 at % of niobium, from 0.1 at % to 5 at % of molybdenum and/or from 0.1 at % to 2 at % of tungsten, from 0 at % to 4 at % of zirconium, from 0 at % to 4 at % of silicon and from 0 at % to 1 at % of carbon, remainder titanium and unavoidable impurities.

9. The process of claim 1, wherein the already produced semifinished product and/or the powder is preheated to a temperature of from about 1000° C. to about 1150° C.

10. The process of claim 1, wherein the layer-by-layer formation of the component is followed by hot isostatic pressing of the component at temperatures of from about 1200° C. to about 1300° C. and at pressures of from about 100 MPa to about 200 MPa for from about 2 to about 8 hours.

11. The process of claim 1, wherein the component has a composition of from 34 at % to 39 at % of aluminum, from 6 at % to 11 at % of niobium, from 3 at % to 5 at % of molybdenum and/or from 0.6 at % to 2 at % of tungsten, from 0 at % to 4 at % of zirconium, from 0 at % to 4 at % of silicon, remainder titanium and unavoidable impurities.

12. The process of claim 1, wherein the component has a composition of from 43 at % to 47 at % of aluminum, from 6 at % to 9 at % of niobium, from 0.1 at % to 1 at % of molybdenum, from 0.1 at % to 2 at % of tungsten, from 0.1 at % to 4 at % of zirconium, from 0.5 at % to 4 at % of silicon, from 0.4 at % to 1 at % of carbon, remainder titanium and unavoidable impurities.

13. The process of claim 1, wherein the component has a composition of from 34 at % to 47 at % of aluminum, from 6 at % to 11 at % of niobium, from 0.1 at % to 5 at % of molybdenum and/or from 0.1 at % to 2 at % of tungsten, from 0 at % to 4 at % of zirconium, from 0 at % to 4 at % of silicon and from 0 at % to 1 at % of carbon, remainder titanium and unavoidable impurities.

14. The process of claim 13, wherein a microstructure of the component comprises Si-containing, C-containing and Zr-containing precipitates.

15. The process of claim 13, wherein the powder has a composition of from 35 at % to 53 at % of aluminum, from 6 at % to 11 at % of niobium, from 0.1 at % to 5 at % of molybdenum and/or from 0.1 at % to 2 at % of tungsten, from 0 at % to 4 at % of zirconium, from 0 at % to 4 at % of silicon and from 0 at % to 1 at % of carbon, remainder titanium and unavoidable impurities.

16. The process of claim 15, wherein the powder has a composition of from 35 at % to 45 at % of aluminum, from 6 at % to 11 at % of niobium, from 3 at % to 5 at % of molybdenum and/or from 0.6 at % to 2 at % of tungsten, from 0 at % to 4 at % of zirconium, from 0 at % to 4 at % of silicon, remainder titanium and unavoidable impurities.

17. The process of claim 15, wherein the powder has a composition of from 45 at % to 53 at % of aluminum, from 6 at % to 9 at % of niobium, from 0.1 at % to 1 at % of molybdenum, from 0.1 at % to 2 at % of tungsten, from 0.1 at % to 4 at % of zirconium, from 0.5 at % to 4 at % of silicon, from 0.4 at % to 1 at % of carbon, remainder titanium and unavoidable impurities.

18. The process of claim 13, wherein the component has a predominantly lamellar microstructure.

19. The process of claim 18, wherein the component has a lamellar structure in more than about 75% by volume of the component.

20. The process of claim 18, wherein the component has a lamellar structure in more than about 90% by volume of the component.

* * * * *